Patented Apr. 26, 1927.

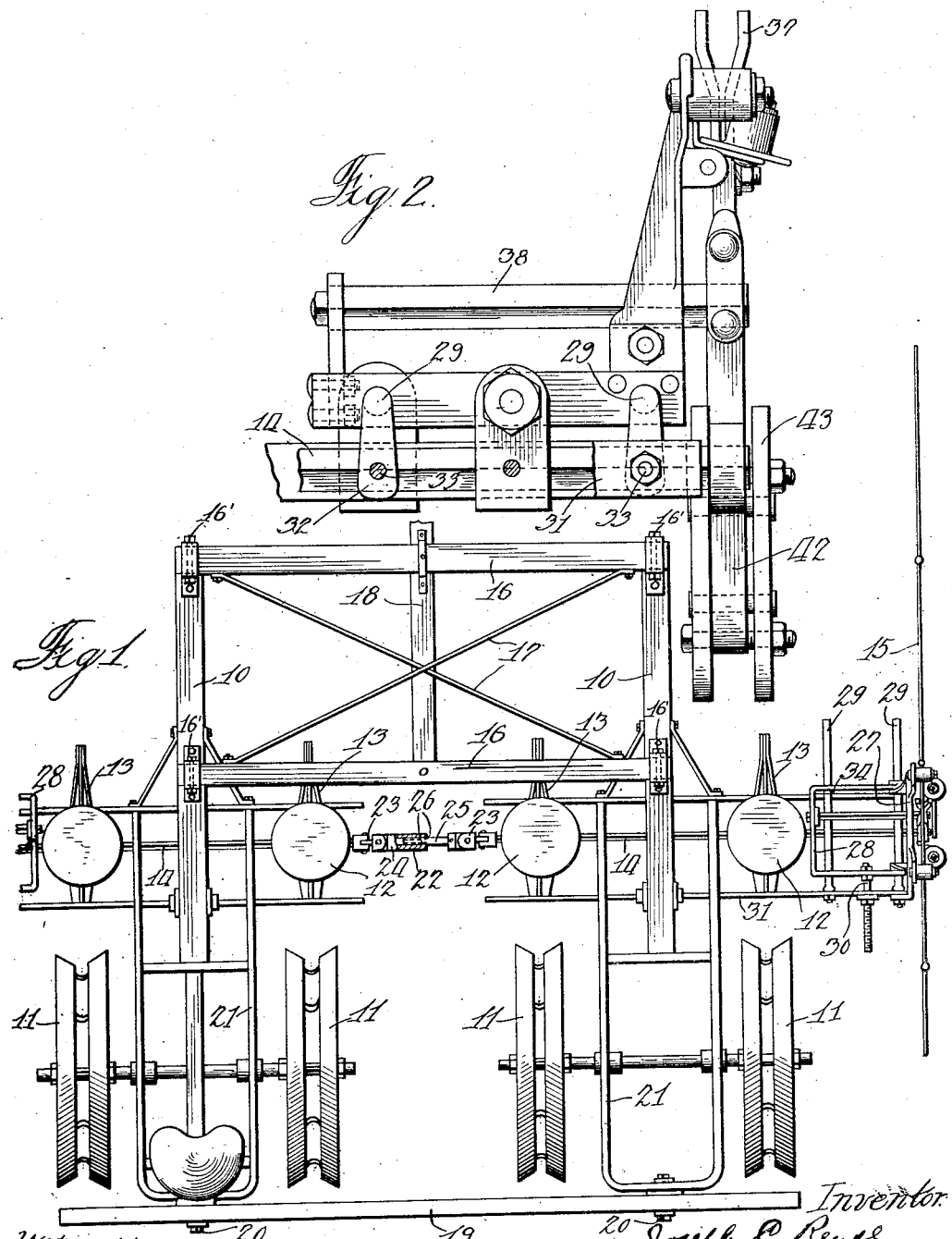

1,626,012

UNITED STATES PATENT OFFICE.

JOSEPH C. REUSE, OF LIBERTYVILLE, ILLINOIS.

CHECKROW PLANTER.

Application filed June 23, 1922. Serial No. 570,481.

This invention relates to implements for planting corn or other grain in rows extending in both directions across the field and has for its object the provision of mechanism by which a single implement may be used for planting more than two rows at each trip across the field, and also an implement which shall be of improved construction and operation.

The invention is exemplified in the combination and arrangement of parts shown in the accompanying drawings and described in the following specification, and it is more particularly pointed out in the appended claim.

In the drawings—

Fig. 1 is a somewhat diagrammatic top plan view showing one embodiment of the present invention;

Fig. 2 is a rear elevation of the check-row attachment.

Check-rowing machines as commonly used are provided with mechanism for planting two rows of grain at each trip across the field. The machines are usually provided with a pair of wheels, two hoppers for containing the grain, and a shoe for each hopper which opens the furrow in which the grain is dropped. The dropping mechanism is actuated by a lever which engages a chain usually made of wire having knots at regular intervals therein. Each time the lever engages a knot in the chain a sufficient number of grains are dropped from the hopper to constitute a hill of corn. Usually such a machine is drawn by a team of horses. Where planting is done by means of a tractor it is desirable to use a machine which will plant more than two rows at a time, since the tractor is capable of drawing a much larger machine than a team of horses, and economy of operation is best obtained if a number of rows greater than two can be planted simultaneously.

In the embodiment of the invention illustrated in the drawings, two standard machines are represented as coupled together for operation simultaneously, thus planting four rows. It will be understood that more than two machines may be connected in the manner shown, or the principles of the invention may be applied to a machine built as a unit and arranged to plant a plurality of rows simultaneously.

Referring to Fig. 1 of the drawings, the numerals 10 designate the poles of a pair of planters of standard construction having wheels 11, grain hoppers 12, and shoes 13 for forming furrows for the grain. Each planter is provided with a square shaft 14 which in ordinary practice is periodically given a partial rotation by the check-rowing mechanism which cooperates with the knotted chain shown at 15.

In the embodiment illustrated, the two poles are connected by cross-bars 16 and bracing stays 17. The bars 16 are pivoted to the poles 10 by pins 16' to permit any necessary vertical movement of the planters relative to one another, due to unevenness of the ground or other causes. A central coupler 18 is secured to the bars 16 to which a tractor or other motive device for pulling the planter may be secured. The planters are spaced from one another in the rear by a bar 19 pivoted at 20 to the frames 21 of the planters. The adjacent shoes 13 of the two machines are thus held in spaced relation a distance from one another corresponding to the spacing of the rows of corn.

In order that the two shafts 14 may be actuated simultaneously a telescoping coupler bar 22 connects the adjacent ends of the shafts 14 and is secured to each bar by universal joints 23. The connector 22 may consist of a hollow sleeve 24 in which a shaft 25 is slidably held from rotation by keys or other similar devices 26. By this arrangement the shafts 14 are caused to rotate in unison with one another and relative movement of the adjacent ends of the shafts is permitted. Where the machine is operated on uneven ground it sometimes happens that one of the planters will be raised above the other so that the connector 22 will assume an angular position. This will necessitate not only movement of the universal joints 23, but elongation of the coupler 22. The telescoping construction of the coupler has been found to be of great importance in practical operation of the machine.

The check-rowing mechanism designated generally by the numeral 27 in Fig. 1 of the drawings may be any standard form of trip mechanism for this purpose. The present invention, however, contemplates a novel mounting and means of adjustment of the trip mechanism especially valuable for planting a large number of rows simultaneously. In the operation of a check-rowing machine the position of the chain 15 must be shifted transversely of the direction of movement of the planter each time the planter reaches the end of the field and is ready to start back in the opposite direction. The distance the chain must be shifted will vary with the width of the machine and where a machine of considerable width is used, the shifting of the chain will cause it to assume an angular position relative to the direction of the rows. Where the machine is only wide enough to plant two rows at a time this angularity of the chain is not a serious matter, but where a wider machine is used it will be apparent that the angular position of the chain will bring the knots out of transverse alinement with their previous position and will cause the check-rowing mechanism to operate either too early or too late, depending upon the particular setting and direction of movement of the machine. To overcome this difficulty the present invention contemplates a supplemental frame 28 which carries the trip mechanism 27 and which is slidably mounted on bars 29 which form supporting ways along which the frame 28 may be adjusted. A threaded rod 30 is secured to the frame 28 and is adjustably connected with a frame member 31 of the planter so that the frame 28 may be moved fore and aft upon its ways 29 to various positions of adjustment. This will regulate the position of the mechanism 27 so that it will engage the knots on the chain 15 at an earlier or later period relative to the movement of the planter, depending upon the position of adjustment of the frame. It will be understood that a frame 28 and trip mechanism therefor is mounted at each side of the combined machine so that one of these trips will be adjacent the chain for each direction of movement of the machine across the field.

I claim :—

Check-row mechanism comprising a pair of planters having forwardly projecting poles, spacing bars pivoted to said poles to permit relative vertical movement thereof, and cross braces for holding said poles against relative movement in a horizontal direction.

In testimony whereof I have signed my name to this specification on this 20th day of June, A. D. 1922.

JOSEPH C. REUSE.